United States Patent
Zhang et al.

(10) Patent No.: US 8,077,682 B2
(45) Date of Patent: Dec. 13, 2011

(54) SECURE ROAMING BETWEEN WIRELESS ACCESS POINTS

(75) Inventors: Junbiao Zhang, Bridgewater, NJ (US); Saurabh Mathur, Plainsboro, NJ (US); Kumar Ramaswamy, Princeton, NJ (US)

(73) Assignee: Thomson Licensing, Boulogne-Billancourt (FR)

( * ) Notice: Subject to any disclaimer, the term of this patent is extended or adjusted under 35 U.S.C. 154(b) by 897 days.

(21) Appl. No.: 10/550,964

(22) PCT Filed: Jan. 29, 2004

(86) PCT No.: PCT/US2004/002491
§ 371 (c)(1), (2), (4) Date: Sep. 26, 2005

(87) PCT Pub. No.: WO2004/095863
PCT Pub. Date: Nov. 4, 2004

(65) Prior Publication Data
US 2006/0193297 A1    Aug. 31, 2006

Related U.S. Application Data

(60) Provisional application No. 60/458,189, filed on Mar. 27, 2003.

(51) Int. Cl.
*H04W 4/00* (2009.01)
*G06F 15/16* (2006.01)

(52) U.S. Cl. ........................ 370/338; 709/227

(58) Field of Classification Search .................. 370/338; 455/411, 432.1–433, 436–443, 445–449, 455/456.1–456.6; 709/227; 713/151, 168, 713/185
See application file for complete search history.

(56) References Cited

U.S. PATENT DOCUMENTS

| | | | |
|---|---|---|---|
| 7,062,262 B2 * | 6/2006 | Baird | 455/419 |
| 2001/0005883 A1 * | 6/2001 | Wray et al. | 713/151 |
| 2001/0024953 A1 | 9/2001 | Balogh | |
| 2002/0041590 A1 * | 4/2002 | Donovan | 370/352 |
| 2002/0046179 A1 * | 4/2002 | Kokudo | 705/51 |
| 2002/0085719 A1 | 7/2002 | Crosbie | |
| 2002/0136226 A1 * | 9/2002 | Christoffel et al. | 370/401 |
| 2002/0191572 A1 | 12/2002 | Weinstein et al. | |
| 2003/0112977 A1 * | 6/2003 | Ray et al. | 380/270 |
| 2003/0115460 A1 * | 6/2003 | Arai | 713/168 |

(Continued)

FOREIGN PATENT DOCUMENTS

JP    11055286    2/1999

(Continued)

OTHER PUBLICATIONS

Search Report Dated Jul. 1, 2004.

(Continued)

*Primary Examiner* — Lester Kincaid
*Assistant Examiner* — Nathan Mitchell
(74) *Attorney, Agent, or Firm* — Robert D. Shedd; Robert B. Levy

(57) ABSTRACT

A system, method, and computer readable medium for enabling roaming of wireless client stations among wireless access points, wherein a gateway programmed to receive session data requests is provided in a network, which comprises access points that are programmed to send session data requests to the gateway. The gateway sends session information setting commands to the requesting access point, or sends a session data failure response to the access point.

21 Claims, 4 Drawing Sheets

U.S. PATENT DOCUMENTS

| | | |
|---|---|---|
| 2003/0142641 A1 | 7/2003 | Sumner et al. |
| 2004/0181663 A1* | 9/2004 | Pienimaki et al. ............ 713/155 |
| 2004/0203771 A1* | 10/2004 | Chang et al. ............... 455/435.1 |
| 2005/0059396 A1* | 3/2005 | Chuah et al. ............... 455/435.1 |
| 2005/0113070 A1* | 5/2005 | Okabe .......................... 455/411 |
| 2005/0177733 A1* | 8/2005 | Stadelmann et al. ......... 713/185 |
| 2008/0119184 A1* | 5/2008 | Rebo et al. .................... 455/433 |

FOREIGN PATENT DOCUMENTS

| | | |
|---|---|---|
| JP | 11055826 | 2/1999 |
| JP | 2000-232455 | 8/2000 |
| JP | 2004-514383 | 5/2002 |
| WO | WO 00/41427 | 7/2000 |
| WO | WO 01/24560 | 4/2001 |
| WO | WO02/41587 | 5/2002 |

OTHER PUBLICATIONS

Anonymous, "Security Solution in Ericsson Wireless LAN Systems", Internet Citation, 1999.

* cited by examiner

SECURE ROAMING BETWEEN WIRELESS ACCESS POINTS

CROSS REFERENCE TO RELATED APPLICATIONS

This application claims the benefit, under 35 U.S.C. §365 of International Application PCT/US04/02491, filed Jan. 29, 2004, which was published in accordance with PCT Article 21(2) on Nov. 4, 2004 in English and which claims the benefit of U.S. provisional patent application No. 60/458,189, filed Mar. 27, 2003.

TECHNICAL FIELD

This invention relates to wireless local area networks, and particularly to methods and systems that facilitate roaming between wireless access points on a wireless access network.

BACKGROUND OF THE INVENTION

IEEE 802.11-based wireless local area networks (WLANs) have become the focus of much research and development in recent years. WLANs offer simple, convenient to use, high throughput ways in which portable computer users can break away from the tethers of the wired world and move around freely with comparable network throughput. However, when a user moves from one access point to another, there is a need to provide seamless roaming. Present technology does not adequately meet this requirement.

In most of the current deployment, IEEE 802.11 uses static Wired Equivalent Privacy (WEP) keys and does not support per user session keys, thus, the wireless stations, usually clients, and all access points participating in roaming can have the same static WEP key. However, the security problem with static WEP keys has been highly publicized. Further, static WEP key protocols do not solve the distribution of authorization information to a large number of access points. To solve this problem, the IEEE 802.11 standard is trying to develop an Inter Access Point Protocol (IAPP).

The IEEE 802.1x standard addresses the security problem in IEEE 802.11 by using port controlled access control. In a large 802.1x installation, a backend authentication server authenticates the user. In order to secure the wireless link, the wireless station must go through an authentication process involving the station, the access point and the authentication server. If authentication is successful, a session key is agreed upon between the wireless station and the access point. This solution enables roaming, but with high overhead, i.e., each time a station is associated with a different access point, for example because of signal fluctuation, the whole authentication process has to be carried through. This is highly undesirable, especially when the authentication server is far away from the wireless LAN, e.g., in an inter-working environment where the WLAN is in, for example, JFK airport but the authentication server belongs to, for example, SBC in California.

There is a need to provide seamless roaming when a wireless user (client) wishes to switch to an access point with better signal strength.

There is also a need to move per-user session keys and authorization information from one access point to another when a client roams between wireless access points.

SUMMARY OF THE INVENTION

These needs and others, which will become apparent from the following disclosure are met by the present invention which comprises in one aspect a wireless local area network comprising gateway to control multiple access points. The access points reside in a wired or other type of network. The gateway is programmed to receive session data requests from access points, look up session data, and send session data back to the requesting access points. The access points are programmed to send requests for session data to the gateway and to receive and process session information setting commands from the gateway.

The system comprising such a gateway moves the "intelligence" of the wireless network into such gateway and results in very simple access points, which enables easier control and more economical installation for large deployments.

In another aspect, the invention comprises a method of, and computer readable medium for, enabling roaming of wireless clients among wireless access points in a network comprising providing a gateway in the network, sending session data requests from access points to the gateway, looking up session data stored in the gateway, reporting session data failure if session data is not found, and sending a session data response from the gateway to the access points if session data is found or is generated by the gateway.

The present invention can compliment the IEEE 802.1x protocol and greatly reduce the complexity of the protocol.

The basic architecture of the system of the invention is illustrated in FIG. 1 wherein a gateway is used to control a number of access points with simple functions. The access points can be directly connected to the gateway or can be connected to the gateway through a network. Besides the normal IEEE 802.11 physical layer and MAC layer functions, these access points need only to support the following additional functions:

Per station session key;

An interface to accept session information (e.g. session key and authorization information) setting commands from the gateway; and The capability to query the gateway about session information and transfer session information from the gateway.

Among these things, the first function is already widely available on many access points on the market presently. The other two functions are novel.

The invention also provides methods to deal with session information on the access point the wireless station (client) previously associated with, after the client roams to a different access point. In a first method, the gateway informs the previous access point to remove the information. In a second method, the access point sets up a timer to remove all idle wireless station entries after a certain time period of inactivity. The second method is preferred because the gateway does not have to send an extra command to remove the entry and the AP may maintain the entry to deal with "thrashing" scenarios in which the wireless station oscillates between two or more access points rather quickly. Because the entry is already there, the access point may just inquire the gateway about the "freshness" of the information instead of transferring all the session information. This may not seem to be significant if the session information only contains the session key, but with large session information, this could be potentially faster and save bandwidth.

There are differences in handling, or transferring, session information generated at the access point versus session information generated at the gateway.

The session information must be transferred to the gateway, thus the gateway must provide an interface for accepting session information, and the access point must be enhanced with the capability of transferring session information to the gateway. This is illustrated in FIG. 3.

When session information is generated at the gateway, the session information need be transferred to the access point that the wireless station is associated with. There are no additional functionalities required at the access point beyond the basic functions mentioned earlier.

For the scheme to be secure, it must be ensured at any time that the connection between the gateway and each AP is trusted. This can be ensured through either physical security or encryption.

Physical security requires directly attaching the access points to the gateway or through a managed network.

Encryption requires that upon initial installation and configuration, the gateway and access points share a secret, or the gateway shares a secret with each access point. The communication between the gateway and the access points are encrypted with the secret(s).

For large deployment of this invention and to facilitate faster roaming, multiple gateways can be organized in a hierarchy. Each gateway is responsible for a number of access points. When the wireless station roams among the access points belonging to the same gateway, session transfer is controlled by this gateway. Only when the station associates with the WLAN the first time or when it roams across access points belonging to different gateways, would it be necessary for the gateway to fetch session information from the gateway in the higher hierarchy.

DETAILED DESCRIPTION

Figure 1:
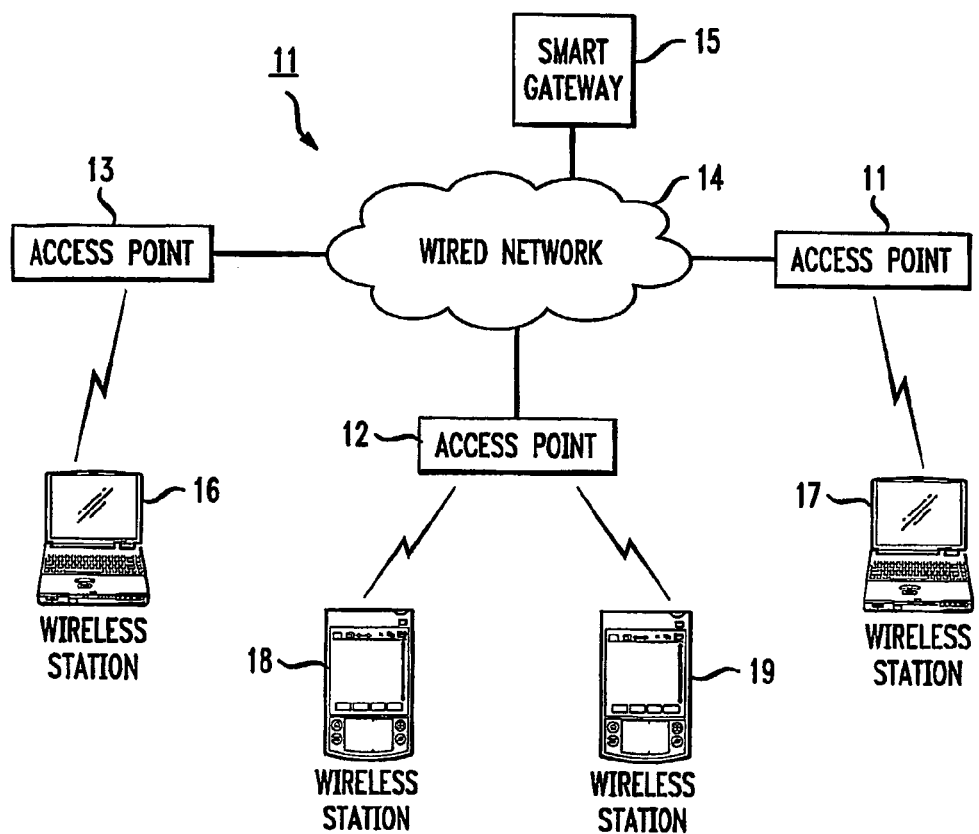
FIG. 1 illustrates an embodiment of a system of the invention having a gateway in the wired network, the wired network comprising access points.

Referring first to FIG. 1, an embodiment of a system according to the invention is illustrated wherein access points 11, 12, and 13 are connected to a wired network 14. There is no limit to the number of access points in the wired network. A smart gateway 15 is connected to the wired network 14. Wireless clients, such as laptop computers 16 and 17 and personal data assistants 18 and 19 are illustrated as communicating with the access points 11, 12, 13. Present generation clients and access points use 802.11 protocols.

Figure 2:
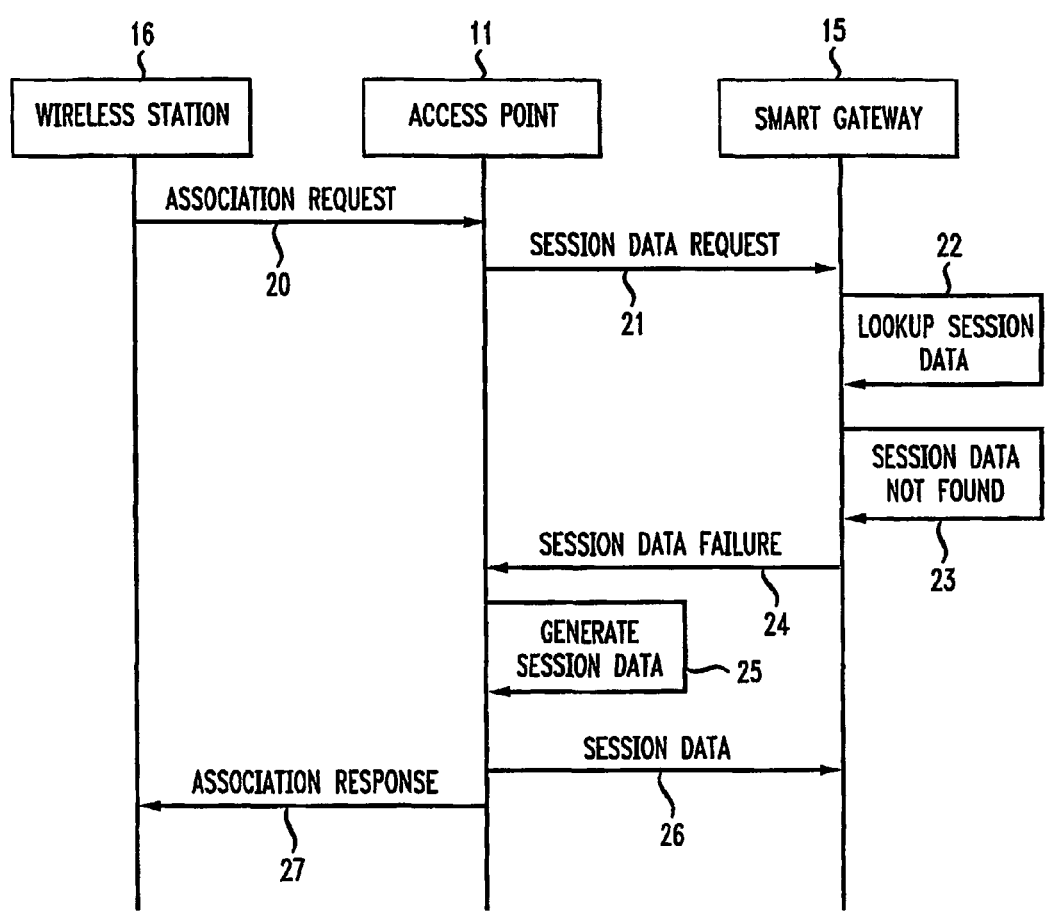
FIG. 2 illustrates a flow chart of a first example of an authentication and association process among a wireless station, an access point, and a gateway according to the invention.

Referring next to FIG. 2, a process is illustrated wherein a wireless station 16 requests an association with an access point 11 during step 20. The access point 11 which relays the session data request to the gateway 15 during step 21. During step 22, the gateway 15 looks up the session data and if session data is not found during step 23, a session data failure signal is relayed during step 24 to the access point 11, which then generates session data during step 25 and sends the generated session data during step 26 to the gateway 15 and also sends an association response to the wireless station 16 during step 27.

Figure 3:
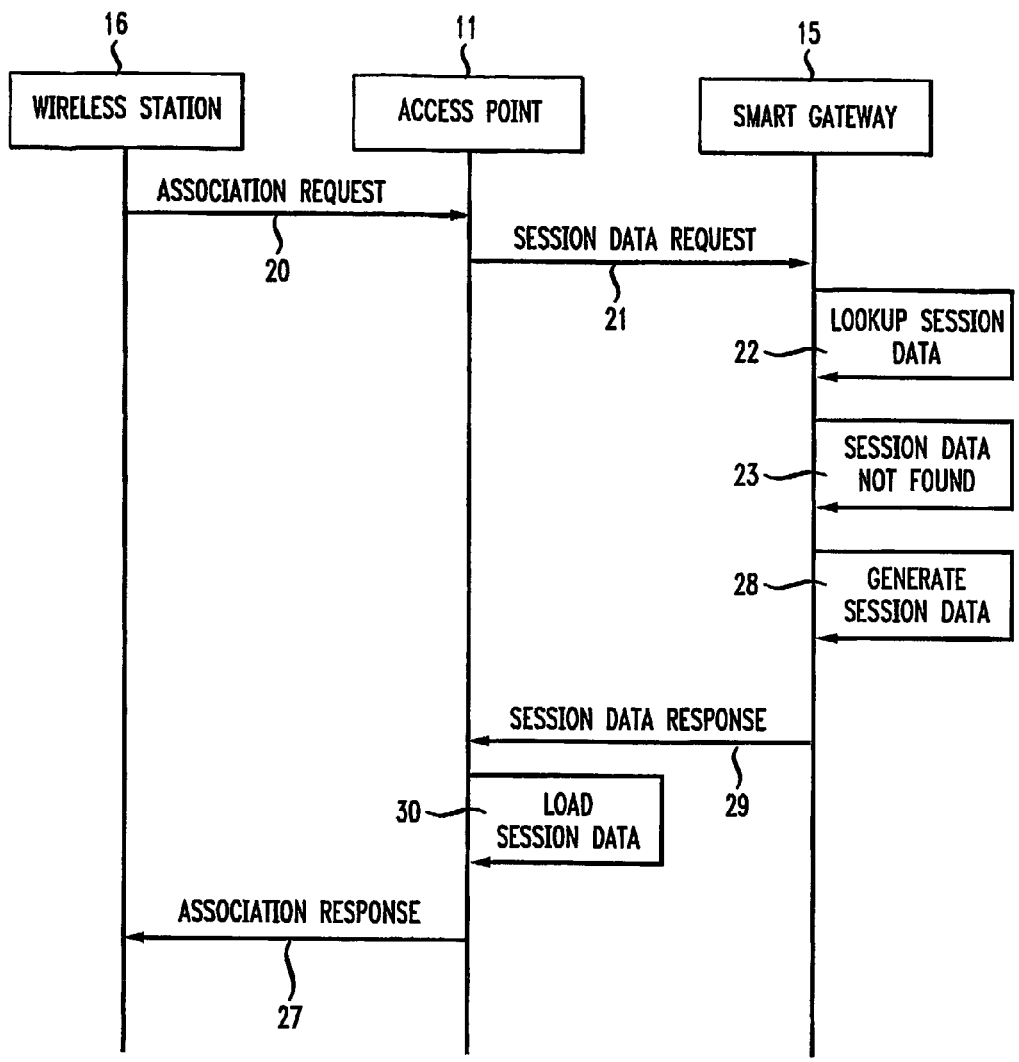
FIG. 3 illustrates a second example of an authentication and association process among a wireless station, an access point, and a gateway according to the invention.

The session information (including session key and authorization information) can be generated at the access points, as illustrated in FIG. 2, or at the gateway, as illustrated in FIG. 3, wherein the wireless station 16 requests an association with an access point 11 during step 20. The access point relays the session data request to the gateway 15 during step 21. The gateway 15 looks up the session data during step 22 and if session data is not found during step 23, the gateway generates the session data during step 28, and sends a session data response back to the access point 11 during step 29. The access point 11 loads the session data during step 30, and sends the association response back to the wireless station 16 during step 27.

Figure 4:
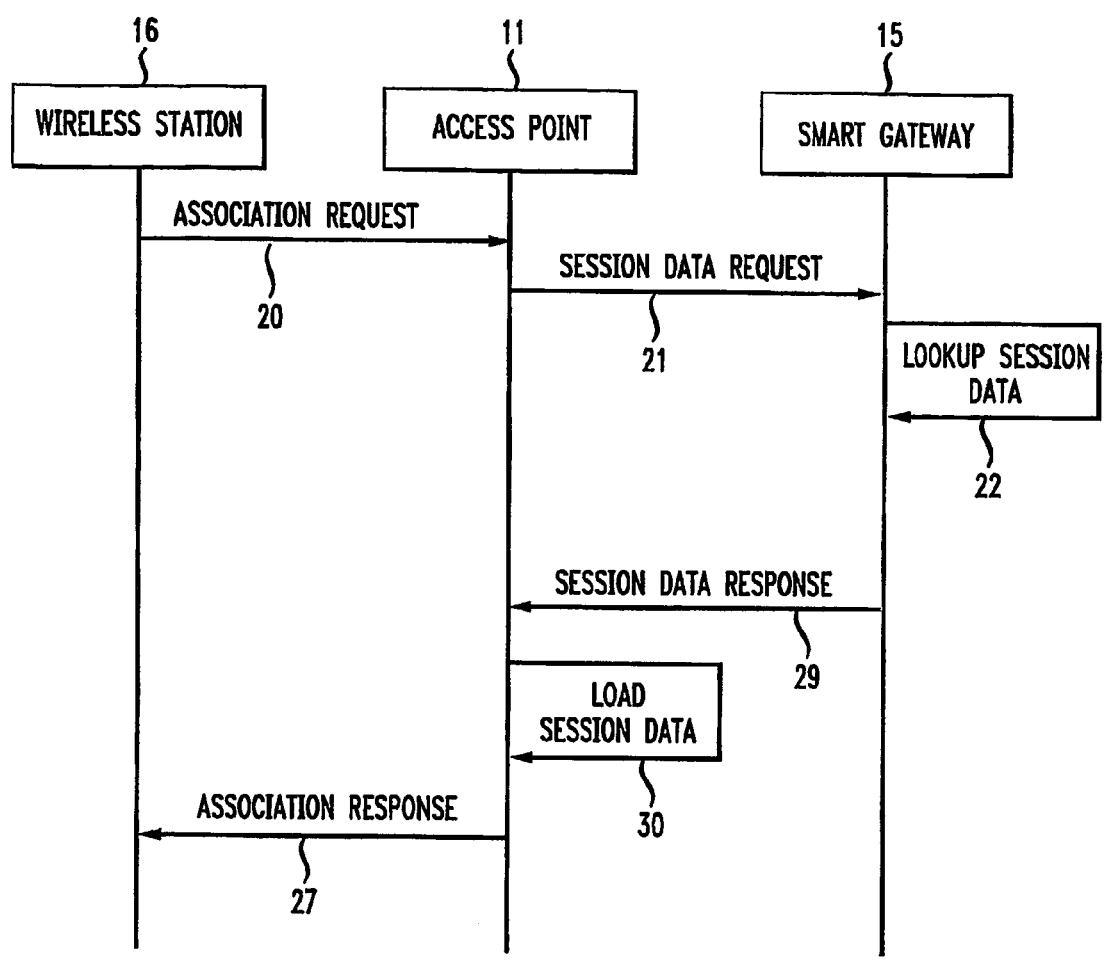
FIG. 4 illustrates a third example of an authentication and association process among a wireless station, an access point, and a gateway according to the invention.

As illustrated in the FIG. 2, FIG. 3, and FIG. 4, the access point first checks with the gateway to see if session information already exists for the wireless station. If session information does not already exist, as illustrated in FIGS. 2 and 3, the wireless station is not authenticated by the WLAN yet or the previous authentication has expired. The normal authentication steps are carried out and session information (including the session key) is generated for the station and is set in both the currently associated access point and the gateway.

If session information already exists, for example, when the wireless station roams from one access point to another, the gateway returns it to the access point. The access point sets that information (including the session key) in the access point. An example of such a process is illustrated in FIG. 4 wherein the wireless station 16 sends the association request to access point 11 during step 20, which relays the session data request to the gateway 15, which in turn looks up the session data during step 22 and finds it. The gateway 15 sends a session data during step 29 to the access point 11 which then loads the session data during step 30 and sends an association response to the wireless station 16 during step 27.

This simple procedure ensures that session information travels with the wireless station from one access point to another without the station having to go through authentication all over again.

Thus the invention described herein provides a secure wireless local area network infrastructure for seamless roaming with smart gateways and simple access points.

While the invention has been described in detail herein, various alternatives, modifications, and improvements should become readily apparent to those skilled in this art without departing from the spirit and scope of the invention.

The invention claimed is:
1. A communications system, comprising:
a gateway connected to a wired network; and
a plurality of access points associated with, and controlled by, the gateway,
wherein each access point is configured (a) to wirelessly communicate with and receive association requests from wireless clients for connection to the wired network through the access point (b) to send session information requests to the gateway in response to received association requests and (c) to process session information setting commands received from the gateway,
wherein the gateway is configured (i) to maintain session information that currently exists for each wireless client connected to the wired network through an access point associated with the gateway, the session information including a session key associated with each wireless client and an associated access point, and (ii) to respond to a session information request from a given access point by providing that access point with currently exist- ing session information, if any, maintained by the gateway for the wireless client requesting association with that access point; and wherein each access point is configured to maintain the session key per associated wireless client.

2. The system of claim 1 wherein each access point is configured to remove session information after a wireless client becomes disassociated with that access point by either responding to a command sent to the access point from the gateway to remove the session information or automatically removing idle wireless client session information entries after a predetermined period of inactivity.

3. The system of claim 1 having means to ensure that a connection between the gateway and an access point is trusted.

4. The system of claim 3 wherein the means comprises physical security or encryption.

5. A method of enabling roaming of wireless clients among wireless access points in a network comprising the steps of (a) providing a gateway in the network in control of the wireless access points, sending session data requests from access points to the gateway, the session data including a session key associated with each wireless client and an associated access point, (b) looking up session data stored in the gateway, reporting session data failure if session data is not found, and (c) sending a session data response from the gateway to the access point if session data is found or is generated by the gateway;

wherein an association request from a wireless client is received by an access point and, after receiving a session data failure response from the gateway, the access point generates session data, reports the generated session data to the gateway and sends an association response to the wireless client.

6. The method of claim 5 wherein an association request from a wireless station is received by an access point and, after receiving a session data response from the gateway, the access point loads session data and sends the session data to the wireless client.

7. The method of claim 5 comprising removing session information from the previously associated access point after a wireless client becomes associated with a new access point comprising the gateway sending a command to the previously associated access point to remove the session information or automatically removing idle wireless client entries after a predetermined period of inactivity.

8. The method of claim 5 wherein the gateway authenticates an access point to ensure that a connection between the gateway and the access point is trusted.

9. The method of claim 8 wherein the authentication is encrypted.

10. A non-transitory computer readable medium encoded with instructions that are executable by a processor in a wireless access point in a network for the wireless access point device to perform the steps of:

receiving an association request from a wireless client;

communicating with a gateway connected to the network to obtain currently existing session information maintained by the gateway, if any, which is associated with the wireless client requesting association to the wireless access point, the session information comprising a session key associated with the wireless client and an associated wireless access point;

receiving a session data response from the gateway, which includes currently existing session information for the wireless client requesting association to the wireless access point; and loading the session information into the wireless access point and sending the session information to the wireless client in an association response transmitted to the wireless client.

11. The computer readable medium of claim 10, further encoded with instructions executable by the processor for the wireless access point to perform steps of:

receiving a session data failure response from the gateway indicating that no session information currently exists for the wireless client, and in response to said received data failure response, generating session data, reporting the generated session data to the gateway and sending an association response to the wireless client.

12. The computer readable medium of claim 10, further encoded with instructions executable by the processor for the wireless access point to perform a step of removing session information for a wireless client previously associated with the wireless access point after the wireless client becomes associated with a new wireless access point.

13. The computer readable medium of claim 10, further encoded with instructions that are executable by the processor of the wireless access point device to perform an authentication process to ensure that a connection between the gateway and the wireless access point is trusted.

14. The computer readable medium of claim 13 wherein the authentication comprises encrypted communications with the gateway.

15. The computer readable medium of claim 12, wherein removing session information for the wireless client is performed by the wireless access point in response to a command sent by the gateway to remove that session information.

16. The computer readable medium of claim 12, wherein removing session information for a wireless client is performed automatically by the wireless access point removing idle wireless client session information entries for the wireless client after a predetermined period of inactivity of the wireless client.

17. The computer readable medium of claim 10, wherein the session data response from the gateway includes an indication of session information failure if no session information for the wireless client is found.

18. The system of claim 1, wherein the gateway is further configured to report session information failure if no session information for the wireless client is found.

19. The system of claim 18 wherein each access point is configured to remove session information after a wireless client becomes disassociated with that access point by either responding to a command sent to the access point from the gateway to remove the session information or automatically removing idle wireless client session information entries after a predetermined period of inactivity.

20. The system of claim 18 having means to ensure that a connection between the gateway and an access point is trusted.

21. The system of claim 20 wherein the means comprises physical security or encryption.

* * * * *